US010393566B2

(12) United States Patent
Henry et al.

(10) Patent No.: US 10,393,566 B2
(45) Date of Patent: Aug. 27, 2019

(54) CENTERING DEVICE FOR WAVEGUIDE

(71) Applicant: Endress+Hauser Inc., Greenwood, IN (US)

(72) Inventors: Eugene E. Henry, Indianapolis, IN (US); Trevor Yenna, Greenwood, IN (US)

(73) Assignee: Endress+Hauser Inc., Greenwood, IN (US)

( * ) Notice: Subject to any disclaimer, the term of this patent is extended or adjusted under 35 U.S.C. 154(b) by 208 days.

(21) Appl. No.: 15/656,311

(22) Filed: Jul. 21, 2017

(65) Prior Publication Data

US 2019/0025110 A1    Jan. 24, 2019

(51) Int. Cl.
*G01F 23/28* (2006.01)
*G01F 23/284* (2006.01)

(52) U.S. Cl.
CPC ................................. *G01F 23/284* (2013.01)

(58) Field of Classification Search
CPC .... G01F 23/284; G01F 23/28; G01F 23/0046; G01F 23/00; G01S 7/40; G01S 13/08; G01S 13/00; H01B 13/20; G02B 6/28; H01P 5/08; H01P 11/00
See application file for complete search history.

(56) References Cited

U.S. PATENT DOCUMENTS

| | | | | |
|---|---|---|---|---|
| 3,630,632 A | * | 12/1971 | Holleman | B23B 29/027 408/82 |
| 4,961,381 A | * | 10/1990 | McLaughlin | F42B 3/185 102/319 |
| 5,013,123 A | * | 5/1991 | Patterson | G02B 6/3801 385/98 |
| 5,158,308 A | * | 10/1992 | Fischer | B23B 31/16287 279/110 |
| 7,525,476 B1 | * | 4/2009 | Delin | G01F 23/284 324/600 |
| 2003/0030517 A1 | * | 2/2003 | Munley | G01F 23/284 333/252 |
| 2016/0069729 A1 | * | 3/2016 | Wardas | G01F 23/284 342/124 |
| 2018/0313684 A1 | * | 11/2018 | Crosier | G01F 23/00 |

FOREIGN PATENT DOCUMENTS

| | | |
|---|---|---|
| DE | 19728280 A1 | 5/1998 |
| DE | 10160239 A1 | 6/2003 |
| DE | 102004032965 A1 | 2/2006 |
| DE | 102012112318 A1 | 6/2014 |

\* cited by examiner

*Primary Examiner* — Francis C Gray
(74) *Attorney, Agent, or Firm* — Christopher R. Powers; PatServe

(57) ABSTRACT

According to at least one aspect of the present disclosure, a centering device includes a body including a first part and a second part connected by a hinge, the hinge structured to enable the first part and the second part to pivot relatively each other about the hinge to form a center channel extending through the body and defining a center axis. The body further includes a clasp, structured to reversibly hold the first part adjacent the second part in an assembled state, and a plurality of members extending radially from the body where, in the assembled state, the center channel and the clasp structured to reversibly attach to a body passing through the center channel.

19 Claims, 4 Drawing Sheets

CENTERING DEVICE FOR WAVEGUIDE

TECHNICAL FIELD

The present disclosure generally relates to a centering device for a rod or cable-like probe, in particular for a probe for determining a level of a medium in an industrial process.

BACKGROUND

The guided wave and the TDR (time domain reflectometry) measurement method is one of a variety of measurement methods to determine the level of a medium in a process container, such as a tank in an industrial process. Generally, in the TDR measuring method a signal is emitted along a surface waveguide or coaxial waveguide that extends into the process medium. A change of dielectric constant at the surface of the medium surrounding the waveguide partially reflects the signal back along waveguide. From the time difference between the emission of the emitted signal and the reception of the reflected echo signal, the level of the medium in the container can be determined.

For process level measurement, generally, a rod or cable-like waveguide protrudes into the container or vessel, usually through a nozzle, often referred to as a stand-off, into the medium. In some cases the wave guide is installed into a still well, which is a pipe installed inside the vessel that extends to or near the bottom. The waveguide may be quite long in applications where the process container is rather tall or the stand-off of the container is particularly tall. Important for the reproducibility and reliability of the measurement, the rod or cable-like waveguide must not touch the vessel wall, stand off or the stilling well. A stilling well can prevent the waveguide being pushed out of its inherently desirable, preferably vertical position in containers due to turbulence and currents in the process medium. In such process conditions, the position of the waveguide relative to the inner wall of the container may be changed. Moreover, a change in position of the waveguide caused by installations that are not vertical or highly turbulent process conditions can result in the probe touching the side of the stilling well thus shorting out the signal.

Similar problems have been encountered with long probes used in capaciatancemeasurement systems. The probe of a capacitance transmitter also must not touch the wall of the vessel, stilling well or stand-off to ensure proper reliably of the system.

An uncontrolled change in position of the waveguide can cause variation in the measurement results such that the results are not comparable with the actual level. If the waveguide contacts an inner wall of the container, the stand-off or the stilling well, an accurate determination of the medium level is no longer possible because the emitted signal may be short circuited or the reflected echo signal may no longer be from the true surface of the medium. In highly agitated media due to, for example, filling processes, emptying processes, mixers or agitators operating in the container, the medium can move waveguide from its mostly vertical position, even within a stilling well, which can foil reproducible measurements. Another problem associated with motion in the medium acting on the waveguide is mechanical stress on the waveguide, which can cause damage over time.

For these reasons, spacers may be attached to the waveguide to hold the waveguide in its desired vertical position with respect to the inner wall of the container, the stand-off and/or the stilling well. However, conventional spacers are generally expensive because they are commonly made of a material that requires machining and because they often require multi-piece assemblies to attach securely to the waveguide. Moreover, conventional spacers can interfere with the level measurement due to pooling of the medium on top-facing surfaces of the spacer. This pooling of the process media can result in the radar signal being reflected from the spacer, resulting in an incorrect reading. Accordingly, there remains a need for further contributions in this area of technology.

BRIEF SUMMARY

According to at least one aspect of the present disclosure, a centering device includes a body having a first part and a second part connected by a hinge, the hinge structured to enable the first part and the second part to pivot relatively each other about the hinge, the first part including a first clasp portion and a first channel, the second part including a second clasp portion and a second channel, the first clasp portion structured to engage the second clasp portion to form a clasp, the clasp structured to reversibly hold the first part adjacent the second part in an assembled state. The centering device further includes a plurality of members extending radially from the body, each member having a distal end opposite the body and having a desired length in the radial direction, where in the assembled state the first channel and the second channel form a center channel extending through the body and defining a center axis, the center channel and the clasp structured to reversibly attach in the assembled state to a body passing through the center channel.

The first clasp portion includes a first row of teeth structured to engage a second row of teeth of the second clasp portion. In an embodiment, the first clasp portion and the second clasp portion each include more than one row of teeth. In certain embodiments, the body includes a substantially cylindrical middle portion, a first frustroconical portion adjacent the middle portion and a second frustroconical portion adjacent the middle portion and opposite the first frustroconical portion, the body having no surface substantially perpendicular to the center axis.

The body and the plurality of members are composed of surfaces that are not substantially perpendicular to the center axis. In a further embodiment, each of the plurality of members includes indicia indicating a length of each member. In a further embodiment, each of the plurality of members include notches at predetermined distances from the center axis, the notches structured to enable a user to change the desired lengths from the center axis to each distal end. In an embodiment, the first channel and the second channel include grippers structured to engage the cylindrical body passing through the center channel in the assembled state, and wherein the center channel and grippers are sized to apply a force in the assembled state sufficient to retain the centering device on the body passing through the center channel. In certain embodiments, the grippers are protrusions from the first channel and the second channel toward the center axis.

According to a further aspect of the present disclosure, the hinge includes a first leaf extending from the first part and a second leaf extending from the second part, the first leaf and the second leaf connected by a center web. In an embodiment, the center web is radiused relative to and is thinner than the first leaf and the second leaf in the radial direction. In certain embodiments, the center web is thinner than the first leaf and the second leaf in the direction of the center axis. The centering device is manufactured of a non-conductive material. In an embodiment, the centering device includes three members extending radially from the body. In an alternative embodiment, the centering device includes four members extending radially from the body.

According to a further aspect of the present disclosure, the centering device is molded in a polymer material, such as polytetrafluoroethylene or polyether ether ketone. In certain embodiments, the centering device is composed of a material having a dielectric constant less than 4.0. In alternative embodiments, the centering device is composed of a material having a dielectric constant less than 2.5.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
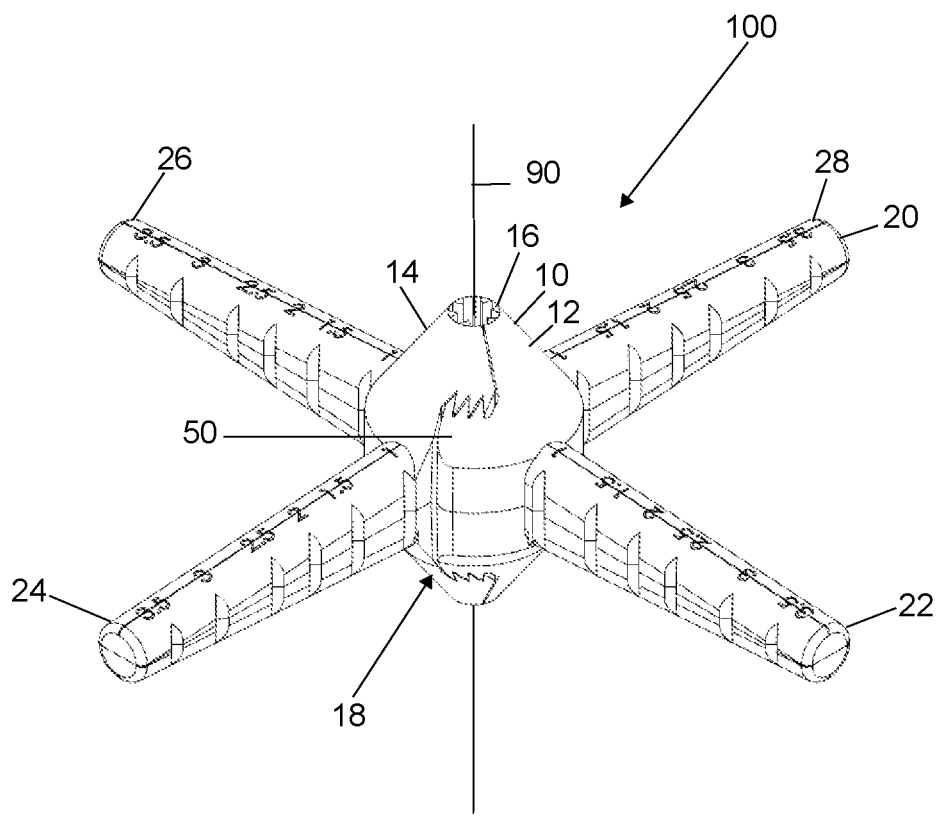
FIG. 1 shows an isometric view of an embodiment of a centering device in an assembled state according to the present disclosure.

The present application discloses various embodiments of a centering device and methods for using and constructing the same. According to one aspect of the present disclosure, a centering device is disclosed that includes a central body of two parts connected by a hinge and includes arms extending radially from the central body. The central body further includes a clasp enabling the centering device to be reversibly and easily attached to a waveguide with sufficient grip to prevent the centering device from moving along the waveguide or separating from it, while the radial arms prevent the waveguide from contacting the walls of a process container, a stand-off of the container or a stilling well surrounding the waveguide. In another aspect of the present disclosure, the arms extending from the central body enable may be cut to desired lengths, making the centering device adaptable to various implementations. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a centering device 100 according to at least one embodiment of the present disclosure. As shown in FIG. 1, the centering device includes a central body 10 having a first part 12 and a second part 14 separated by a joint 18 and defining a center channel 16 extending through the central body 10 in an assembled state. A plurality of arms 20 extend from the central body 10. In the exemplary embodiment of FIG. 1, the centering device 100 includes four arms: a first arm 22, a second arm 24, a third arm 26 and a fourth arm 28. However, the centering device 100 may include any number of desired arms 20, including more than four arms 20 or fewer. For example, in at least one embodiment, the centering device 100 may include three arms 20. The centering device 100 may include at least two arms 20. The arms 20 may extend radially from the central body 10 relative to a center axis 90 defined by the center channel 16. In embodiments having an even number of arms 20, the arms 20 may extend from the central body 10 opposite one another. The arms 20 may be rigid or, in certain embodiments, the arms 20 may have a degree of flexibility.

Figure 2:
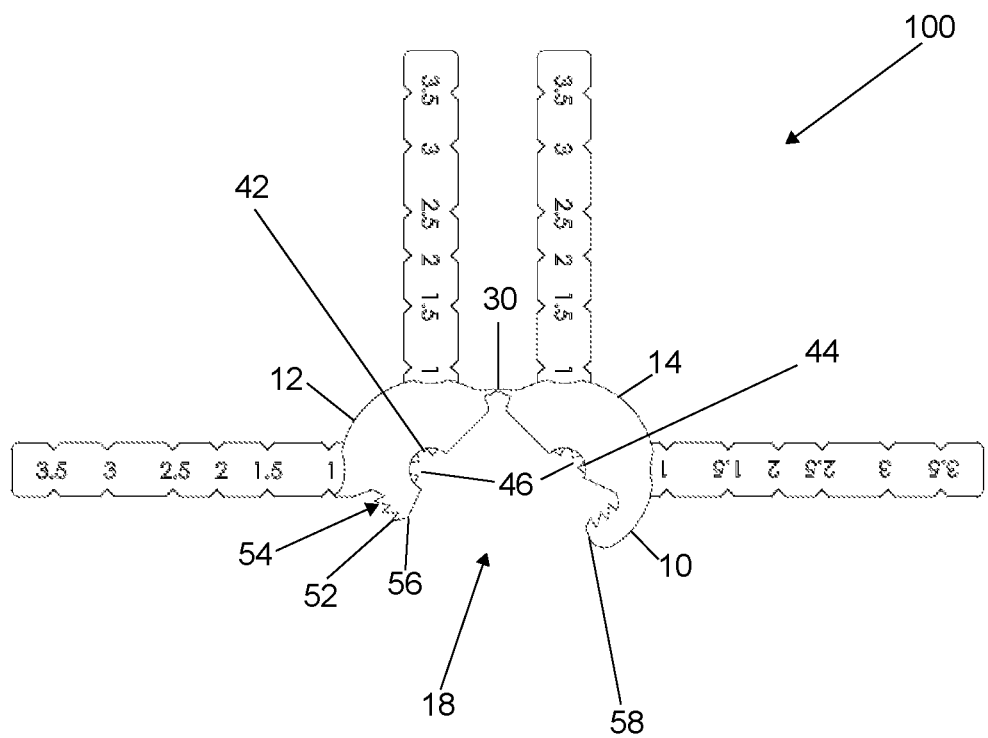
FIG. 2 shows a plan view of an embodiment of the centering device in an unassembled state according to the present disclosure.

FIG. 2 shows the embodiment of the centering device 100 of FIG. 1 in an unassembled state. As shown in FIG. 2, the first part 12 and second part 14 of the central body 10 may be linked by a hinge 30. In certain embodiments, the hinge 30 may be disposed generally opposite the joint 18. In such embodiments, the hinge 30 may further define the first and second parts 12, 14. The hinge 30 is structured to enable the first part 12 and the second part 14 to pivot relatively each other about the hinge 30 and to seat against one another in an assembled state, as shown in FIG. 1.

As shown in FIG. 2, the first part 12 may further include a first channel 42 through the body 10, and the second part 14 may further include a second channel 44 through the central body 10. The first channel 42 and the second channel 44 form the center channel 16 in the assembled state. The first channel 42 and the second channel 44 may include grippers 46 to facilitate secure attachment of the centering device 100 to a body disposed within the center channel 16, such as a waveguide of a level measurement probe. In certain embodiments, the grippers 46 may be protrusions that extend toward the center axis 90, in the assembled state. In operation, a user of the centering device 100 may bring the first part 12 and second part 14 together around a waveguide by flexing the hinge 30 until the first part 12 and second part 14 seat against or nearly seat against one another, such that the waveguide is disposed in the center channel 16 and extends through the central body 10.

In the assembled state, the first part 12 and second part 14 may be reversibly held together by a clasp 50 of the joint 18. As shown in FIGS. 1 and 2, the clasp 50 may include a first clasp half 56 of the first part 12 and a mating second clasp half 58 of the second part 14. In at least one embodiment, the clasp 50 may be disposed opposite the hinge 30 and may include a plurality of mating teeth 52 arranged on the first clasp half 56 and second clasp half 58 at or near the joint 18. The plurality of mating teeth 52 of the first clasp half 56 may be complementary to the mating teeth 52 of the second clasp half 58 and structured to engage with one another in the assembled state to firmly but reversibly hold the first part 12 and second part 14 in close proximity with one another. The hinge 30, center channel 16 and clasp 50 are structured to apply a sufficient grip force to a body disposed within the center channel 16 to prevent the centering device 100 from translating (i.e., slipping, moving or canting) about the body disposed within the center channel 16. The grippers 46 may further increase the grip force applied to a body disposed within the center channel 16.

The first clasp half 56 and second clasp half 58 may include multiple rows 54 of mating teeth 52 that enable various degrees of closure of the clasp 50. For example, in operation, one row 54 of complementary mating teeth 52 from each the first clasp half 56 and second clasp half 58 may be engaged to provide minimal engagement of the clasp 50, which yields a center channel 16 of a given size and, thus, a given grip force. By further example, two or more complementary rows 54 of complementary mating teeth 52 from each the first part 12 and second part 14 may be engaged to provide further closure of the clasp 50, which yields a smaller center channel 16 as the first part 12 and second part 14 are brought in closer proximity and which generates a greater grip force. To open the clasp 50 and return the centering device 100 to the unassembled state, a tool may be inserted into the clasp 50 at or between the rows 54 of mating teeth 52 and then levered or pried apart, thereby releasing the first part 12 from the second part 14 at the joint 18 and releasing the centering device 100 from the waveguide. In such an embodiment, the hinge 30 may include sufficient flexure to enable a separation of the mating teeth 52 of the first part 12 and second part 14 and thereby separation of the first part 12 from the second part 14. Further, the mating teeth 52 may have sufficient toughness to withstand repeated engagement and disengagement of the clasp 50.

Figure 3:
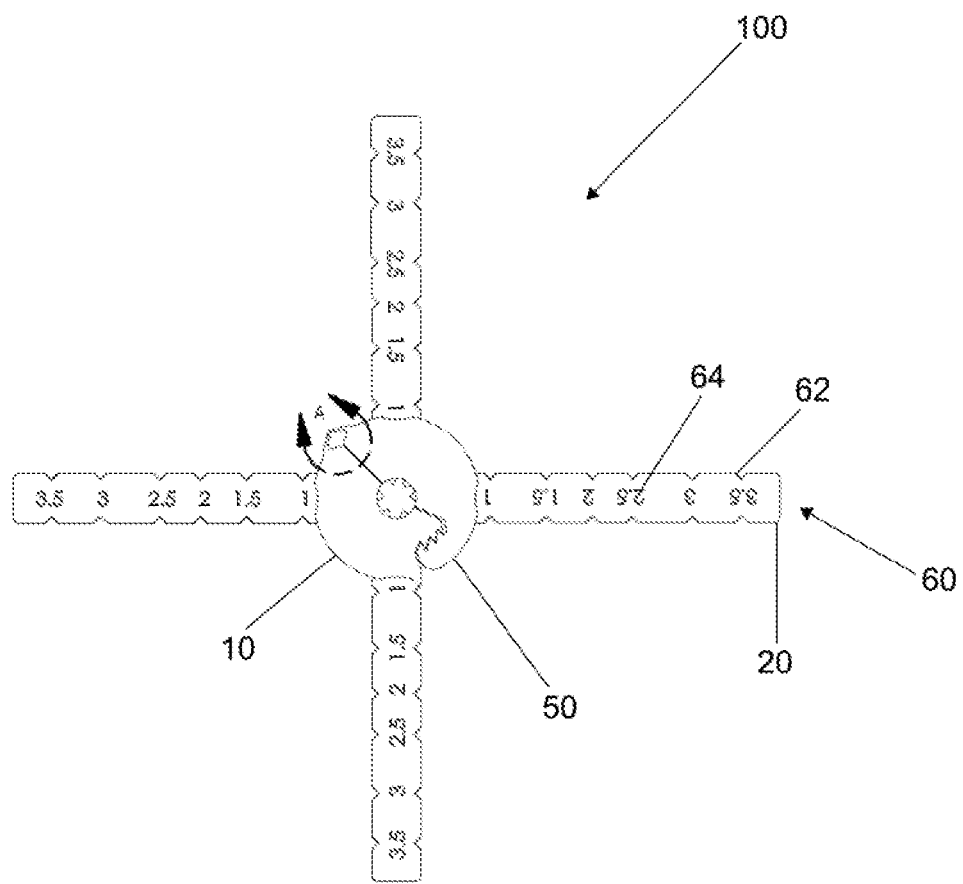
FIG. 3 shows a plan view of the centering device of FIG. 2 in the assembled state according to the present disclosure.
Figure 4:
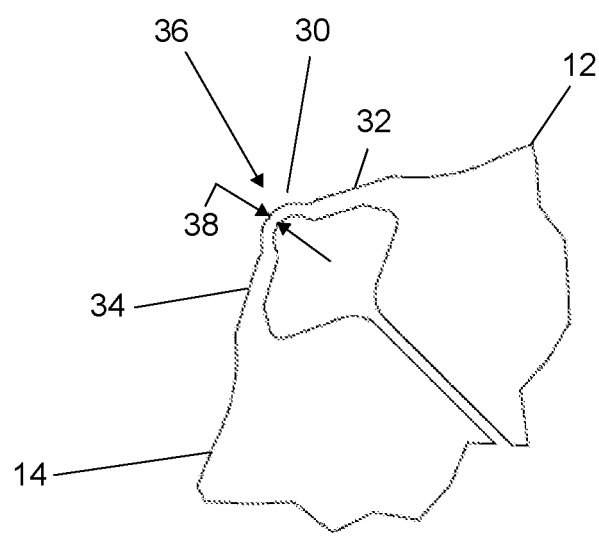
FIG. 4 shows a partial detailed view of an embodiment of a hinge according to the present disclosure at section A of FIG. 3.

FIG. 3 shows a top view of the centering device 100 in the assembled state, in which the clasp 50 is closed or locked. FIG. 3 further indicates detail A of the hinge 30, which is shown in FIG. 4. The hinge 30 may be a living hinge. As shown in FIG. 4, the hinge 30 may include a band of material extending from and integral with the first part 12 and the second part 14. The hinge 30 may include a first leaf 32, a second leaf 34 and a center web 36, where the first leaf 32 extends from the first part 12 and the second leaf 34 extends from the second part 14, the first leaf 32 and second leaf 34 connected by the center web 36. The hinge 30 may have a uniform thickness or a varying thickness. In at least one embodiment, a thickness 38 of the center web 36 may be less than a thickness of the first leaf 32 and second leaf 34. In such an embodiment, the hinge 30 may have improved longevity and flexibility relative to hinges of uniform thickness.

The center web 36 of hinge 30 may be radiused such that center web 36 arcs between the first leaf 32 and second leaf 34. In such an embodiment, the radiused center web 36 facilitates alignment of the material structures (e.g., molecular alignment in a hinge 30 manufactured in a polymer material), which reduces residual manufacturing stresses in the hinge 30, which further improves longevity and flexibility relative to hinges without radiused center portions.

Referring to FIGS. 1 and 2, the hinge 30 and clasp 50 enable the centering device 100 to be reversibly attached in the assembled state to a body passing through the center channel, such as a rope, cable, cord, tube, electrode or shaft. In certain applications, the centering device 100 may be attached to a waveguide of a guided radar level measurement system to prevent the waveguide from contacting any surface besides the process medium being measured, for example, a process container containing the medium, the stand-off of the process container or a stilling well surrounding the waveguide. When the position of the waveguide is disturbed, the arms 20 extending from the central body 10 limit displacement of the waveguide by contacting the surface and maintaining a degree of separation between the surface and the waveguide. In certain applications, the centering device 100 may maintain separation and isolation for a waveguide that extends in a non-vertical direction. In such non-vertical applications, a moment acts upon the waveguide that would cause contact with undesired surface but for the centering device 100.

In all applications, the first and second parts 12, 14 of the central body 10, flexing at the hinge 30, may be bent around the waveguide such that the waveguide passes through the center channel 16. The centering device 100 may then be fixed in position about the waveguide by engaging (i.e., closing) the clasp 50 as tight as necessary to apply sufficient grip force to the waveguide and thereby prevent the centering device 100 from separating from or translating along the waveguide. Because the clasp 50 may be disengaged, the centering device 100 may be easily repositioned along the waveguide as desired. In certain applications, centering devices 100 may be spaced every 20 to 30 centimeters (cm) along a waveguide. Additionally and alternatively, centering devices 100 may be spaced along a waveguide at distance adequate to prevent a waveguide form contacting any surface besides the medium in a given application.

Having multiple rows 54 of mating teeth 52 enables clasp 50 to affix to waveguides of various sizes and to provide redundancy to the engagement of the mating teeth 52. In certain embodiments, the first channel 42 and second channel 44 may be proportioned to form a center channel 16 of a desired size, for instance, the diameter of the waveguide. In such embodiments, all rows 54 of mating teeth 52 may be engaged to securely affix the centering device 100 to the waveguide and to generate increased grip force. The centering device 100 may be employed in applications with coated waveguide cable, for example, a cable having a diameter of 4 millimeters. The desired size of the center channel 16 may include the size of the grippers 46. The center channel 16, grippers 46 and clasp 50 may be sized to apply a desired grip force in the assembled state sufficient to retain the centering device 100 on a waveguide disposed in the center channel 16. The centering device 100 may be similarly employed to prevent a probe of a capacitance measurement system from contacting any undesired surface and thus sized accordingly.

Referring to FIG. 3, each of the arms 20 of the centering device 100 extends from the central body 10 to a distal end 60, defining a length of each arm 20. Each arm 20 may include a number of notches 62 along its length at predetermined distances from the central body 10. The notches 62 facilitate cutting or trimming of the arm 20 to shorten its length as desired for a given application of the centering device 100. Consequently, an embodiment of the centering device 100 may be manufactured and then modified by a user to the desired length of the arm 20. For example, to employ an embodiment of the centering device 100 having arms 20 that are 4 cm long relative to the center axis 90 in a stilling well having a diameter of 4 cm, the user may trim each arm 20 at the appropriate notch 62 to an arm length of 2 cm or less. As a reference for the user, each arm 20 may further include indicia 64 at or near each notch 62 indicating the distance of the notch 62 from the center axis 90.

The centering device 100 may be made of any material having suitable flexibility (i.e., strain or elasticity), specifically for the hinge 30, and toughness (i.e., tensile or yield strength), for example, for the mating teeth 52. In at least one embodiment, the centering device 100 may be an injection molded polymer or composite material. In further embodiments, the centering device 100 may be made of a material having good chemical resistance, specifically chemical resistance to the process medium of the application in which the centering device 100 is employed. In further embodiments, the centering device 100 may be made of a material having good thermal resistance, specifically thermal resistance at least to the anticipated temperatures of the process medium of the application in which the centering device 100 is employed.

In at least one embodiment, the centering device 100 may be made of a non-conductive material having a low dielectric constant value or a dielectric constant similar to that of the process medium. Because a change of dielectric constant at the surface of the medium surrounding the waveguide at least partially reflects the signal back along waveguide, a large difference in dielectric constant between the material of the centering device 100 and the ambient air may cause measurement errors in which no exact level of the medium can be determined. Accordingly, the selected material of the centering device 100 may have a low dielectric constant so as not to reflect and interfere with an electromagnetic signal being transmitted along the waveguide. In at least one embodiment, the centering device 100 may be a grade of polytetrafluoroethylene (PTFE), perfluoroalkoxy copolymer (PFA), polyether ether ketone (PEEK), nylon (PA), polypropylene (PP), or polyethylene (PE), which are chemically resistant to many solvents and other aggressive chemicals and have low dielectric constants. Such polymers include grades having fillers and/or additives to improve the thermal resistance of the material for a given application of the centering device 100. Exemplary PTFEs include Teflon®, and exemplary PEEKs include Nyleen® 1441. Non-conductive materials are less likely to interfere with an electromagnetics signal traveling along the waveguide.

In at least embodiment of the present disclosure, both the central body 10 and the arms 20 may be composed of curved or angled surfaces such that no surface is substantially perpendicular to the center axis 90. Flat surfaces that are perpendicular to the center axis 90 may allow process media to pool upon top-facing surfaces, and the pooled media can reflect an electromagnetic signal propagating along the waveguide, thereby affecting the measurement signal of the probe on which the centering device 100 is employed. Moreover, flat, top-facing surfaces themselves can reflect an electromagnetic signal propagating along the waveguide, thereby affecting the measurement signal of the probe. The curved or angled surfaces of the centering device 100 minimize pooling of the process medium and the resultant reflected signals.

While various embodiments of a centering device and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A centering device comprising:
   a body including a first part and a second part connected by a hinge, the hinge structured to enable the first part and the second part to pivot relatively each other about the hinge, the first part including a first clasp portion and a first channel, the second part including a second clasp portion and a second channel, the first clasp portion structured to engage the second clasp portion to form a clasp, the clasp structured to reversibly hold the first part adjacent the second part in an assembled state; and
   a plurality of members extending radially from the body, each member having a distal end opposite the body and having a desired length in the radial direction,
   wherein in the assembled state the first channel and the second channel form a center channel extending through the body and defining a center axis, the center channel and the clasp structured to reversibly attach in the assembled state to a body passing through the center channel.

2. The centering device of claim 1, wherein the first clasp portion includes a first row of teeth structured to engage a second row of teeth of the second clasp portion.

3. The centering device of claim 2, wherein the first clasp portion and the second clasp portion each include more than one row of teeth.

4. The centering device of claim 1, wherein the body includes a substantially cylindrical middle portion, a first frustroconical portion adjacent the middle portion and a second frustroconical portion adjacent the middle portion and opposite the first frustroconical portion, the body having no surface substantially perpendicular to the center axis.

5. The centering device of claim 1, wherein the body and the plurality of members are composed of surfaces that are not substantially perpendicular to the center axis.

6. The centering device of claim 1, wherein each of the plurality of members includes indicia indicating a length of each member.

7. The centering device of claim 1, wherein each of the plurality of members include notches at predetermined distances from the center axis, the notches structured to enable a user to change the desired lengths from the center axis to each distal end.

8. The centering device of claim 1, wherein the first channel and the second channel include grippers structured to engage the cylindrical body passing through the center channel in the assembled state, and wherein the center channel and grippers are sized to apply a force in the assembled state sufficient to retain the centering device on the body passing through the center channel.

9. The centering device of claim 8, wherein the grippers are protrusions from the first channel and the second channel toward the center axis.

10. The centering device of claim 1, wherein the hinge includes a first leaf extending from the first part and a second leaf extending from the second part, the first leaf and the second leaf connected by a center web.

11. The centering device of claim 10, wherein the center web is radiused relative to and is thinner than the first leaf and the second leaf in the radial direction.

12. The centering device of claim 11, wherein the center web is thinner than the first leaf and the second leaf in the direction of the center axis.

13. The centering device of claim 1, wherein the centering device is manufactured of a non-conductive material.

14. The centering device of claim 1, wherein the centering device includes three members extending radially from the body.

15. The centering device of claim 1, wherein the centering device includes four members extending radially from the body.

16. The centering device of claim 1, wherein the centering device is molded in a polymer material.

17. The centering device of claim 16, wherein the centering device is molded in polytetrafluoroethylene or polyether ether ketone.

18. The centering device of claim 1, wherein the centering device is composed of a material having a dielectric constant less than 2.5.

19. The centering device of claim 1, wherein the centering device is composed of a material having a dielectric constant less than 4.0.

* * * * *